J. R. MILLS.
Corn-Planter.
No. 29,807.
Patented Aug. 28, 1860.
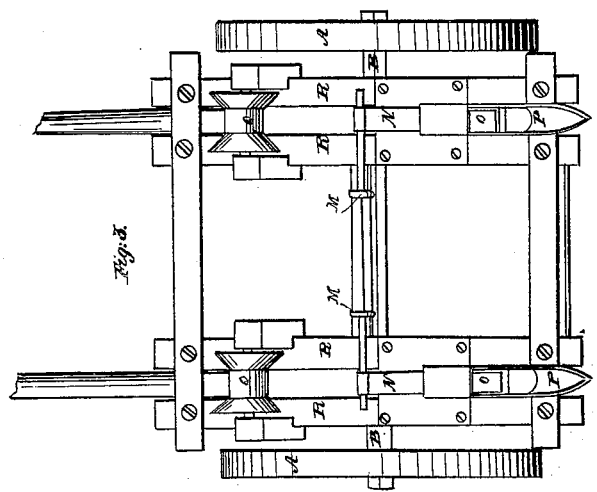
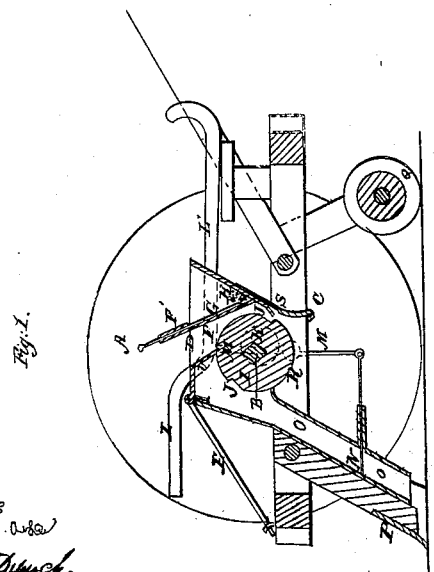
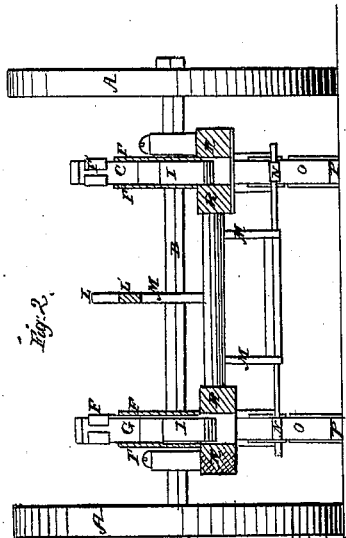

UNITED STATES PATENT OFFICE.

JAMES R. MILLS, OF BLOOMFIELD, IOWA.

IMPROVEMENT IN SEED-PLANTERS.

Specification forming part of Letters Patent No. 29,807, dated August 28, 1860.

*To all whom it may concern:*

Be it known that I, JAMES R. MILLS, of Bloomfield, in the county of Davis and State of Iowa, have invented a new and useful Improvement in Seed-Planters; and I do hereby declare that the following is a full, clear, and exact description of the same, reference being had to the accompanying drawings, forming a part of this specification, in which—

Figure 1 represents a vertical longitudinal section, Fig. 2 a vertical cross-section, and Fig. 3 a bottom view, of the machine.

Similar letters of reference in each of the several figures indicate corresponding parts.

The nature of my invention consists in the relative arrangement of a detachable hopper, slides, seed-distributer, square shaft, and lever, constructed in the manner and for the purposes hereinafter to be described.

To enable others skilled in the art to make and use my invention, I will proceed to describe its construction and operation.

The machine rests upon two driving-wheels, A A. Between the wheels, and between each two of the beams R of the main frame, the seed-hoppers D are arranged. Each of these hoppers is held in its place by means of a link-rod, E, and a pin, C, passed through an eye in the under end of a flange, S, (extending downward from the hopper, as seen in Fig. 1,) and underneath and across the beams R R. Whenever it is desirable to remove the hopper for the purpose of cleaning or repairing it, it may be done by unhooking the rod E and pin C, and the planting of seed may thus be proceeded with without any great delay. The hopper D is subdivided by an oblique board, U, which is partially open, so as to admit of the passage of a revolving seed-distributer, I. There is another inclined subdivision, F, between the distributer and the back of the hopper. This division has also a slot in its lower end to admit the seed H to the seed-distributer. The size of this slot can be regulated by a slide, G, playing in suitable guideways, F'. As the seed passes through the said slot onto the seed-distributer I, which, being slipped over the square shaft B of the driving-wheels, revolves together with the latter, the notches J in the circumference of the distributer carry the seed around and drop it into the spout O, which communicates with an opening in the bottom of the hopper in front of the distributer. The seed is retained in the spout by a horizontal slide, N, and may be dropped onto the ground at the proper time by the operator lifting the rear end, L', of lever L L'. The arm M, which extends from the lever L L' downward, is fastened to a horizontal shaft, K, and the lower end of arm M is pivoted to the rear end of slide N. On lifting the rear end of lever L L', the shaft K serving as the fulcrum of said motion of the lever, the lower end of arm M moves back, so as to withdraw the slide N and allow the seed to drop through the spout O into the furrow made by the shoe P in front of the lower end of the spout. The rear end part, L', of the lever L L' is made of sufficient weight to bear down, and thus keep the spout closed by means of slide N until the eperator raises the lever. This way of constructing the lever is an advantage over a separate weight hung to the lever. Such a weight is jerked about when the seed-planter is drawn over stones or other inequalities of the ground, and would be apt to throw the lever upward, so as to open the slide N and allow some of the seed to drop out of the spout.

Q are the usual coverers for closing the furrows over the seed in rear of the spout O.

What I claim as my invention, and desire to secure by Letters Patent, is—

The relative arrangement of a detachable hopper, D, slides G and N, seed-distributer I, square shaft B, and lever L L', constructed in the manner and for the purposes set forth.

The above specification of my improvement in seed-planters signed by me this 26th day of June, 1860.

JAMES R. MILLS.

Witnesses:
J. H. LUCAS,
JOHN SNODDY.